Dec. 13, 1932.  F. J. ADAMS  1,890,766
MOUNTING THE STEERED WHEELS OF ROAD VEHICLES
Filed May 2, 1929  2 Sheets-Sheet 2
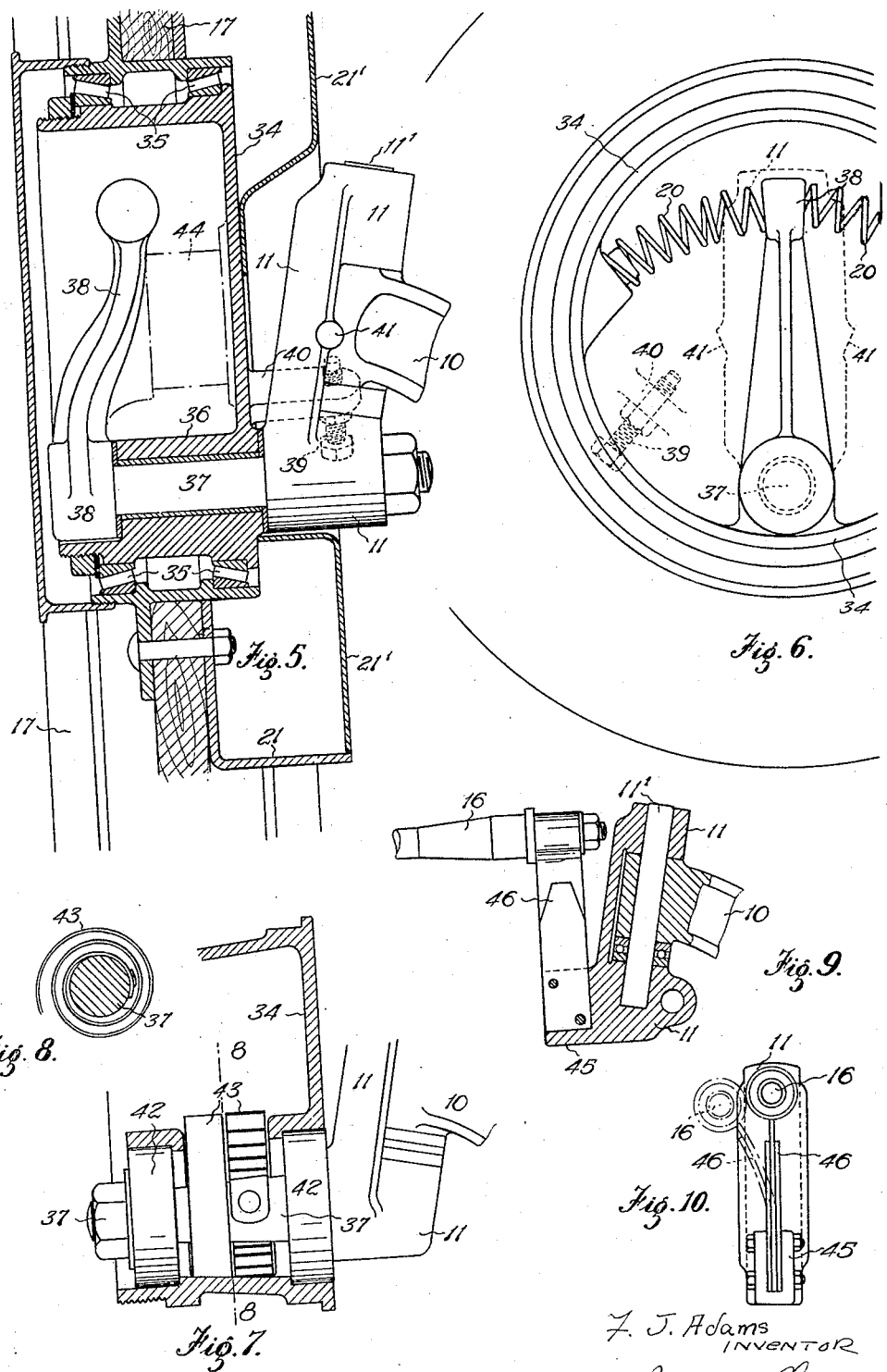

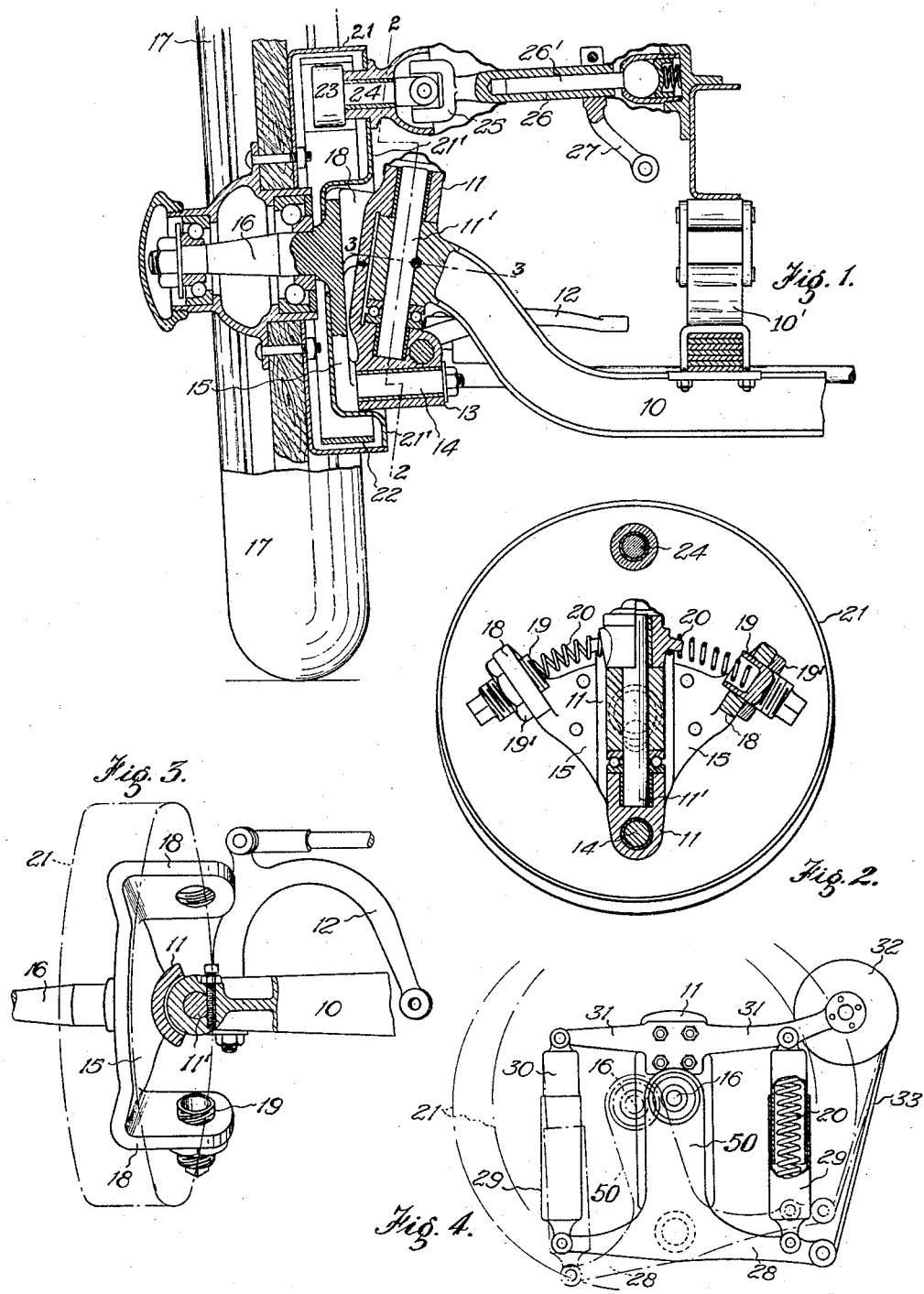

Patented Dec. 13, 1932

1,890,766

UNITED STATES PATENT OFFICE

FRANK JOHN ADAMS, OF BRIGHTON, VICTORIA, AUSTRALIA

MOUNTING THE STEERED WHEELS OF ROAD VEHICLES

Application filed May 2, 1929, Serial No. 359,979, and in Australia January 31, 1929.

This invention relates to improvements in mounting the steered wheels of road vehicles and refers especially to means for supporting the front or steered wheels of motorcars and the like.

Difficulty is frequently experienced in steering motor vehicles over smooth or irregular road surfaces owing to vibrations of various kinds being set up in the complex system formed by the front or steered wheels, steering knuckles, front axle and suspension springs and associated parts.

The elimination or control of these vibrations, variously known as "steering wheel fight," "wheel wobble," or "shimmy," according to the nature of the movement, has become increasingly difficult since the advent of heavier vehicles, four wheel brakes and balloon tyres, partly because of the more favorable natural period of vibration resulting therefrom, the increased kinetic energy involved in the vibratory movements, and the reaction of the relatively soft balloon tyres on obstructions or irregularities in the road surface.

Whilst, as far as I am aware, no method is known of eliminating these oscillations, correct design, accurate wheel balance, and the use of high pressure in the tyres are ameliorating factors. It is desired, however, to avoid the use of high pressure tyres because of their hard riding qualities.

Now, the object of the present invention is to provide improved means for mounting the steered wheels of vehicles whereby the above mentioned disabilities will be eliminated or reduced in effect.

I accomplish this object by providing a chassis, a steering knuckle on the chassis, a member so supported on the steering knuckle that it may oscillate in a substantially vertical plane, a steered wheel rotatively mounted on the member and having its axis disposed above the axis of oscillation of said member, and means for resiliently resisting the displacement of the said member.

In one form of the invention, the stub axles of the wheels are mounted on cranks which are pivotally supported near their lower ends on the steering knuckles, the said cranks being capable of displacement in the planes of rotation of the respective wheels.

In lieu of providing cranks, eccentrics may be employed for carrying the said wheels.

Fixed or adjustable means may be provided for limiting the extent of the angular displacement of the cranks, and resilient members are preferably employed for relieving shock when the cranks are displaced and for assisting in normally maintaining the same in a central position.

A salient feature of the invention consists in so arranging the oppositely disposed steered wheels that the same have different natural periods of vibration whereby combined oscillations will be reduced to a minimum.

For this purpose the said springs may be adjusted to exert differential pressures or cranks of unequal lengths may be employed.

Having set forth the object and nature of the invention, reference is made to the drawings wherein:—

Figure 1 is a view in sectional front elevation of one of the steered wheels and associated parts of a motor vehicle constructed in accordance with the present invention.

Figure 2 is a view in sectional side elevation taken on the line 2—2 of Figure 1.

Figure 3 is a view in sectional plan taken on the line 3—3 of Figure 1.

Figure 4 is a view in side elevation partly in section showing a modified form of the invention.

Figure 5 is a view in sectional elevation of a steered wheel and associated parts and shows a construction wherein an eccentric is employed in lieu of a crank for supporting the steered wheels.

Figure 6 is a view in side elevation of the construction shown in Figure 5, the cap being removed for the purposes of illustration.

Figure 7 is a fragmentary view similar to Figure 5 and shows a modified form of eccentric construction.

Figure 8 is a view in sectional side elevation taken on the line 8—8 of Figure 7.

Figure 9 is a view in sectional elevation of a further form of the invention; and Figure 10 is a view in side elevation of the construction shown in Figure 9.

Referring to Figures 1 to 3 of the drawings, the reference numeral 10 designates a front axle, fitted with suspension springs 10' adapted to support the forward end of a vehicle, and provided with oppositely disposed steering knuckles 11 oscillatively mounted on king pins 11'. The steering knuckles 11 are fitted with steering knuckle arms 12 and are arranged and controlled in any suitable manner not indicated in the drawings.

Each knuckle 11 is provided at its lower end with a bearing 13 adapted to accommodate a spindle 14 carrying an upwardly projecting crank 15 having at its free end a crank pin 16 forming the stub axle of the respective steered wheel 17.

It will be apparent from the drawings that the weight of the vehicle tends to maintain the cranks in vertical positions so that, in the event of a wheel being displaced by reason of road inequalities or other disturbances, the respective crank is restored to the central position by gravity.

The cranks 15 are provided with integrally formed lugs 18 adapted to accommodate adjusting screws 19 having recesses therein to receive the adjacent portions of compression springs 20 which bear at their opposite ends against the respective steering knuckles 11.

The adjusting screws are preferably fitted with lock nuts 19'.

It will be obvious from the drawings that the adjustment screws 19 also serve to limit the maximum angular displacement of the cranks with respect to the steering knuckles.

When brakes are fitted to the steered wheels, the same may be arranged and actuated in any approved manner; in the construction shown in the drawings, the brake drums 21 are secured to the wheels in the usual way and the bands 22 are expanded by means of cams 23 on the ends of spindles 24 having universal joint connections 25 with shafts 26.

The shafts 26 are slidably supported on guide rods 26' and are adapted to be angularly displaced by means of operating rods (not shown) fitted to the free ends of levers 27. Cover plates 21' are secured to the respective cranks 15. By arranging the brake mechanism in this manner, displacement of the cranks 15 may take place without interfering with the control of the brakes; as above indicated, however, this construction is given only by way of example as the brakes may be controlled by hydraulic or pneumatic means or in any other approved way.

With the orthodox mounting of steered wheels, any displacement of one wheel is directly transmitted to the opposite wheel by means of the steering cross rod, and, as both wheels have substantially the same natural oscillatory period, the vibrations are accentuated and frequently become sustained when conditions are favorable.

By means of the present invention, however, each wheel is permitted to move independently when an obstruction is encountered, and this tends to prevent corresponding movements being set up in the opposite wheel with the result that the tendency to break into sustained oscillations is reduced; furthermore, as the change in angularity of the cranks alters the natural period of vibration of the wheels about their respective king pins 11', a vibration started in any one position is damped by the change in periodicity caused by the displacement of the cranks.

In addition, however, the springs 20 are preferably so adjusted that the two steered wheels have different natural periods of vibration which also serves to prevent the initiation of corresponding vibratory movements in one wheel when the opposite wheel strikes an obstruction or commences to vibrate because of the transmission thereto of engine or chassis vibrations.

In this manner, the movements of one wheel tend to damp out oscillations in the opposite wheel as will be readily understood.

In an alternative construction (not illustrated) the oppositely disposed steered wheels 17 may be mounted on cranks of unequal lengths in order that the right and left hand units will have different natural oscillatory periods.

Damping devices (not shown) are preferably provided to absorb the energy of the rebound, and these devices may be of any approved type, such as those generally employed in automobile practice.

In an alternative form of the invention (see Figure 4) a crank 50 is provided with laterally extending arms 28 adapted to be pivotally connected to the lower members 29 of telescopic cylinders enclosing springs 20. The upper members 30 of the telescopic cylinders are pivotally connected to the opposite ends of a bracket 31 rigidly secured to the steering knuckle 11.

Any approved means may be provided for adjusting the normal pressure of the springs 20.

A snubber 32 may be mounted on the bracket 31 and connected to the adjacent arm 28 on the crank by means of a flexible band 33.

Figure 5 indicates a form of the invention wherein an eccentric 34 is employed in lieu of a crank for permitting relative angular displacement of the wheels with respect to the steering knuckles.

In this construction, the eccentric 34 consists of a cylindrical member provided on its outer periphery with circumferential seatings for antifrictional bearings 35 adapted to engage the hub of the wheel 17.

The eccentric 34 is provided with an eccentrically disposed bearing 36 accommodating a spindle 37 rigidly secured to the lower end of the steering knuckle 11.

It will be clear from the drawings that the spindle 37 is disposed below the center of the cylindrical member comprising the eccentric 34.

An arm 38 on the outer end of the spindle 37 is accommodated within the eccentric 34 and the same is normally located in a vertical position midway between springs 20 which are supported on seatings within the eccentric and which may be adjustable if desired in any approved manner.

The angular displacement of the eccentric 34 may be limited by means of screws 39 adjustably mounted in lugs 40 formed in the eccentric and arranged to engage bosses or seats 41 on the steering knuckles.

For convenience of adjustment, the lugs 40 are shown arranged on the exterior of the eccentric where the same are readily accessible.

In the form of the invention illustrated in Figures 7 and 8 of the drawings, the eccentric 34 is mounted on antifriction bearings 42 fitted to a laterally projecting spindle 37 on the lower end of the steering knuckle 11.

Right and left hand spiral springs 43 are arranged between the bearings 42, their inner ends being secured to the spindle 37 and their outer ends to the eccentric 34.

If preferred snubbing devices of any approved type may be arranged in association with the eccentrics as illustrated in Figures 5 and 7 and the same are preferably located therewithin as diagrammatically illustrated at 44 in Figure 5.

In the construction illustrated in Figures 9 and 10 of the drawings, the lower end of the steering knuckle 11 is provided with a laterally extending socket 45 adapted to receive the lower end of a vertically disposed leaf spring 46 carrying a stub axle 16 at its upper and free end.

If desired, guide members (not shown) may be provided for preventing any twisting of the leaf spring 46.

When a wheel mounted on the axle strikes an obstruction, the leaf spring is flexed rearwardly as indicated in Figure 10, thereby permitting of the desired relative movement.

As previously stated, the present invention, by permitting each steered wheel to move independently when passing over obstructions, tends to prevent the initiation of sympathetic vibrations of the opposite wheel; and, in addition, by employing different natural periods of vibration for the two wheels, this tendency is further reduced.

Apart from the elimination or reduction of vibrations, the invention is also conducive to easy riding and tends to prevent excessive strains on the vehicle structure.

If preferred, only one of the steered wheels may be mounted in the manner set forth herein, as this is sufficient to permit of relative movement between the two wheels.

In a further alternative form of the invention (not illustrated) the cranks or eccentrics may be so arranged as to permit of displacement on one side only of the normal position and, in this case, only one spring 20 is necessary for each wheel 17, though a rubber or like resilient uniting member is preferably arranged to bear against the opposite side of the crank.

Whilst preferred forms of the invention have been described and illustrated herein, it will be understood that many modifications other than those indicated may be effected without departing from the spirit and scope thereof.

I claim:—

1. In a road vehicle, a chassis, steering knuckles oscillatively mounted on the chassis, means for displacing the steering knuckles in unison, spindles projecting laterally from the steering knuckles, hollow eccentrics oscillatively supported on and projecting upwardly from the spindles, arms on the spindles within the eccentrics, and resilient members arranged within the eccentrics and adapted to coact with the said arms and steered wheels rotatively mounted on the eccentrics.

2. In a road vehicle according to claim 1, lugs projecting laterally from the eccentrics on opposite sides of the steering knuckles, and screws adjustably mounted in the lugs and adapted to coact with the said steering knuckles to limit the extent of angular movement of the said eccentrics.

3. In a motor vehicle according to claim 1, damping devices arranged within the eccentrics and connected to the respective arms on the spindles and to the said eccentrics.

4. In a road vehicle, a steering knuckle, an upwardly extending member pivotally connected near its lower end to the steering knuckle, a steered wheel rotatively supported on the upwardly extending member and springs for resiliently resisting the angular displacement of the said upwardly extending member.

5. In a road vehicle, a steering knuckle, an upwardly extending member pivotally connected near its lower end to the steering knuckle, a road wheel rotatively mounted on the upwardly extending member and having its axis above the pivot point thereof, and springs for resiliently resisting the displacement of the upwardly extending member, characterized in that the upwardly extending member is so arranged as to be angularly displaced parallel to the plane of the wheel.

6. In a road vehicle, a chassis, steering knuckles arranged on opposite sides of the chassis and adapted to be actuated in unison, upwardly extending members pivotally connected near their lower ends to the steering knuckles, steered wheels rotatively mounted on the upwardly extending members and having their centers disposed above the pivotal axes thereof, and springs for resiliently resisting the angular displacement of the upwardly extending members, characterized in that the said upwardly extending members are arranged to be displaced parallel to the planes of the respective steered wheels.

7. In a road vehicle according to claim 6, means for causing the opposed steered wheels to have different natural periods of vibration.

8. In a road vehicle according to claim 6, stops for limiting the angular displacement of the upwardly extending members.

9. In a road vehicle according to claim 1, compression springs arranged on opposite sides of and adapted to bear against the arms to resist angular displacement of the eccentrics.

10. In a road vehicle according to claim 1, anti-friction races mounted on the exterior of the hollow eccentrics to engage the inner surfaces of the hubs of the said steered wheels.

11. In a road vehicle, a chassis, steering knuckles mounted on the chassis and adapted to be actuated in unison, axles projecting laterally from the steering knuckles, upwardly extending hollow eccentrics oscillatively supported on the axles, closed inner ends and open outer ends on the eccentrics, upwardly extending arms secured to the axles within the eccentrics, compression springs bearing against opposite sides of the arms and adapted to resist the displacement of the eccentrics, caps on the outer ends of the eccentrics, steered wheels rotatively supported on the eccentrics, and coacting stops on the eccentrics and respective steering knuckles for limiting the angular displacement of the said eccentrics.

12. A road vehicle according to claim 6 wherein the upwardly extending members are so arranged that the radial distances between the axes of the steered wheels and the pivots of the said upwardly extending members are different on opposite sides of the said vehicle.

13. In a road vehicle, a chassis, steering knuckles oscillatively mounted on the chassis, substantially vertical circular members pivoted eccentrically on the steering knuckles and having their centers disposed above said pivots, springs for resisting angular displacement of the circular members about the pivots, and road wheels mounted concentrically on the circular members.

14. In a road vehicle, a member supported on the vehicle and adapted to oscillate in a substantially vertical plane, a steered wheel rotatively mounted on said member and having its axis disposed above and in the same plane as the axis of oscillation of said member, and means for resiliently resisting the angular displacement of the said member.

15. In a road vehicle, a chassis, a steering knuckle oscillatively mounted on the chassis, a member pivotally mounted on the steering knuckle, whereby it may oscillate in a substantially vertical plane, a road wheel rotatively mounted on the pivotally mounted member and having its axis disposed above the axis of the pivotal connection between said member and the steering knuckle, and resilient means for resisting the angular displacement of the said pivotally mounted member.

16. In a road vehicle, a chassis, steering knuckles on the chassis, upwardly extending cranks pivoted near their lower ends to the steering knuckles, steered wheels rotatively mounted on the upper ends of said cranks, the axes of said wheels being substantially parallel to the axes of the pivotal connections between the cranks and the steering knuckles, and springs for resiliently resisting displacement of said cranks.

17. A road vehicle according to claim 5, wherein the eccentrics are of hollow formation and the springs are arranged within circular members.

In witness whereof I hereunto affix my signature.

FRANK JOHN ADAMS.